Nov. 30, 1948.      J. NASH      2,454,938
EDGE FOR T-SQUARE AND THE LIKE
Filed Aug. 2, 1944
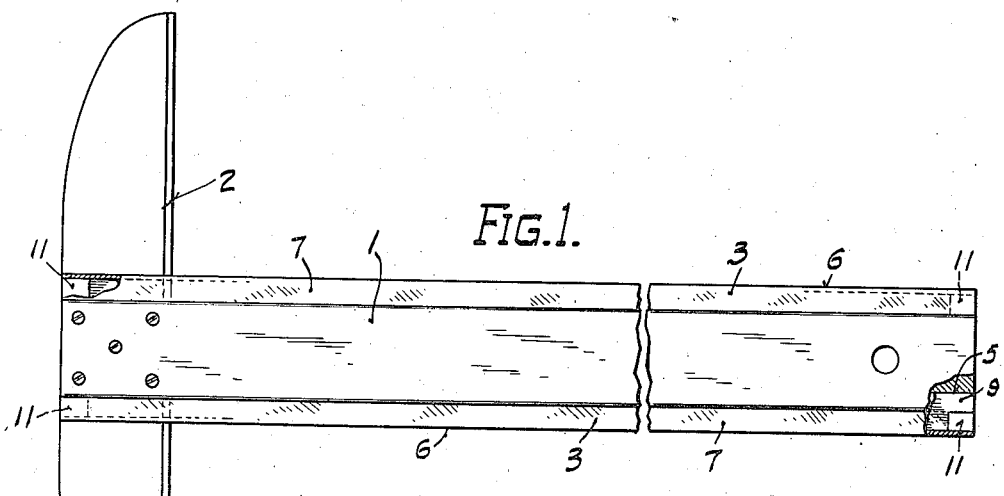
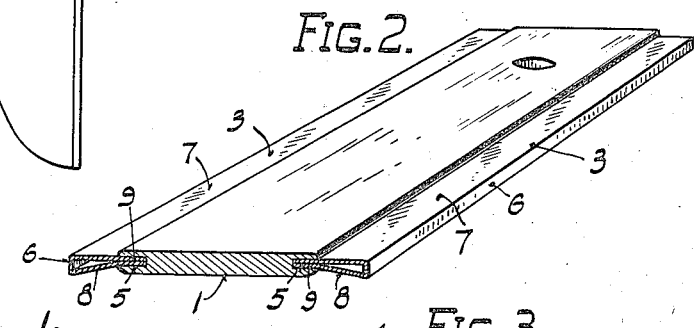
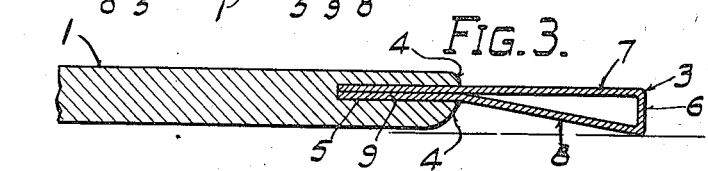
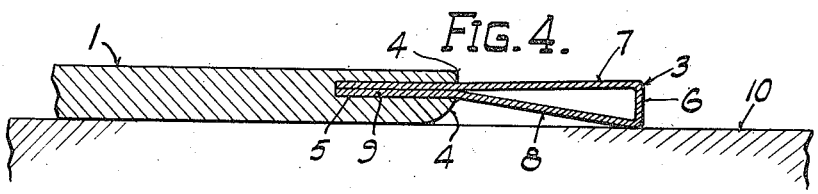
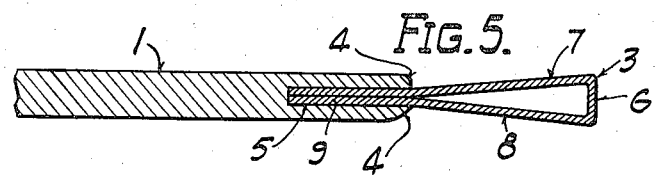
James Nash
INVENTOR.
BY *Irvin C. Andrus*
ATTORNEY.

UNITED STATES PATENT OFFICE 2,454,938

EDGE FOR T-SQUARE AND THE LIKE

James Nash, Milwaukee, Wis., assignor to Eclipse Moulded Products Company, Milwaukee, Wis., a corporation of Wisconsin Application August 2, 1944, Serial No. 547,654

4 Claims. (Cl. 33—112)

This invention relates to an edge for T-square and the like for straight edge drawing purposes.

One object of the invention is to provide an edge that eliminates machining and which can be constructed at considerably less cost than previous edges.

Another object is to provide an edge in which the working portion is positively straight.

Another object is to provide a flexible preloaded edge that establishes good contact with the drawing paper or the like.

Another object is to provide an edge in which only the lower outer portion of the edge touches the drafting surface to substantially eliminate scratching of the edge and retain its transparency.

Another object is to provide an edge of substantial thinness and increased transparency.

A further object is to provide an edge that may be assembled and secured to a T-square strip or the like for working purposes without cementing or likewise securing the edge to the strip with which it is assembled.

A further object is to provide an edge that may be readily assembled with any generally thin strip with which it may be employed.

The invention is preferably carried out by forming the edge of varying cross-section from suitable plastic sheet material and assembling the thinner inner edge portion of the formed edge in a groove provided in the central strip of a T-square or the like with the thicker outer edge portion providing a straight working surface without any machining operation.

Other objects and advantages of the invention appear herein in connection with the description of the embodiments of the invention illustrated in the accompanying drawing.

In the drawings:

Figure 1 is the top plan view of a T-square with which the invention has been employed;

Fig. 2 is a perspective view of a portion of the blade of the T-square;

Fig. 3 is a fragmentary transverse section through the edge of the T-square of Figure 1 showing the edge as it appears before being laid on a drafting board;

Fig. 4 is a similar view of the same edge as it appears after being laid on a drafting board; and Fig. 5 is a fragmentary section of an edge illustrating another embodiment of the invention.

Referring to the drawings, there is illustrated a T-square with which the invention has been successfully embployed, comprising a central strip 1 having a head 2 at one end and edges 3 extending substantially the length of the strip on either side thereof to provide the blade of the T-square.

Strip 1 has substantial width and is preferably fabricated of generally thin vertical section from suitable plastic material. Head 2 may be fabricated or moulded of plastic material similar to strip 1 and is secured thereto in any suitable manner.

Strip 1 is provided along its longitudinal sides with the curved surface 4 and the longitudinally extending groove 5 is machined or otherwise horizontally provided in the face of each side edge of the strip. Surface 4 at least on the bottom portion of strip 1 recedes from the mouth of groove 5 with a slant sufficient to prevent any tendency of drafting paper to catch thereagainst.

Each horizontal groove 5 has a substantial depth and preferably extends the entire length of the sides of strip 1 to receive the respective edges 3 as will be more fully described hereinafter. The location of grooves 5 in the sides of strip 1 with reference to the top and bottom of the strip depends upon the thickness of strip 1 and the particular shape to which the edges 3 have been formed as shown by the embodiments of the invention illustrated in Figs. 3 and 5.

Since edges 3 and groove 5 at each side of the blade are similar, only one edge and groove of each embodiment need be described.

In the embodiment of the invention illustrated in Figs. 3 and 4, groove 5 is slightly removed from the center of the side of strip 1 toward the top of the strip.

Edge 3, illustrated in Figs. 3 and 4, comprises an outer longitudinal edge portion 6 of substantial heighth and with a straight vertical face, a generally straight horizontal upper side 7, a slanting lower portion 8 and at the inner end a tongue portion 9 of generally thin section and comprising the inner edges of portions 7 and 8 extending horizontally.

Edge 3 is formed from a generally thin strip or sheet of clear transparent plastic material by longitudinal rolling, pressing or the like to provide outer edge portion 6, upper side 7, slanting lower portion 8 and tongue 9, as described. The manner of rolling or folding the plastic edge strip over upon itself provides the face of outer edge portion 6 as a positively straight working surface and establishes a spring loading of the free ends of tongue 9 that secures edge 3 within groove 5 when assembled therein. The maintenance of edge 3 within groove 5 is additionally assured by the substantial overlapping contact of the tongue 9 therein and the fact that the tongue is adapted to fit tightly in groove 5.

The spring loading of tongue 9 enables edge 3 to be retained in groove 5 for ready removal therefrom. Cement or the like, however, may be employed to secure edge 3 within groove 5, if desired.

Upon assembly of edge 3 with strip 1 by inserting the tongue 9 in groove 5, the bottom outer corner of edge 3 extends slightly lower than the bottom surface of strip 1, as illustrated in Fig. 3 to enable initial contact of edge 3 with the drawing board 10 shown in Fig. 4 before the bottom of strip 1 contacts the board or drawing surface when the T-square is placed thereon. The pre-loading of edge 3 in this manner, which is possible because of its proportions and the relative thinness and flexibility of the tongue 9 at the mouth of groove 5 forces the edge to tightly hug the board or surface on which it is placed, and always maintain tight contact therewith no matter what may be the condition of the surface that the edge contacts.

In this manner a portion of the weight of strip 1 is transmitted through the edge 3 to the outer lower corner of portion 8 to insure the tight contact desired. However, this preloading of the edge should not be so great as to prevent strip 1 from contacting the drafting board by its own weight, since where the strip 1 is supported by the edges 3 it becomes subject to movement downwardly by the hand of the draftsman and thereby may cause movement of the outer edge portion 6 and create inaccuracies in drawing.

Slanting portion 8 eliminates any contact of the edge with drawing board 10 except that between the outer corner of slanting side 8 and board 10 as illustrated in Fig. 4. The remaining portion of side 8 approaching strip 1 is out of contact with the drawing board at all times and this feature of the invention maintains the transparency of the edge by eliminating any scratching contact of the edge with the paper or drawing board.

After edge 3 is formed and disposed in groove 5 there is no need to machine the face of outer end 6 of the edge to make it a working surface.

The other embodiment of the invention illustrated in Fig. 5 has been developed for the purpose of employing edge 3 with a thinner center strip 1 than illustrated in Figs. 3 and 4.

In Fig. 5, horizontal groove 5 is located substantially centrally of the side edge of strip 1 and edge 3 is provided with a taper on both the upper side 7 and lower side 8. The edge is formed in the same manner as previously described in connection with the embodiment illustrated in Fig. 3 and is likewise provided with a straight face on outer edge portion 6 on which no machining is required to employ it as a working surface.

In assembling edge 3 with strip 1, the tongue 9 is inserted in groove 5 and the outwardly directed spring force of the free edges of the members of the tongue holds the tongue in the groove. Cement may be employed to additionally hold the edge in place if desired. The edges 3 may extend to the extreme ends of the T-square, or plugs 11 may be cemented in the hollow portion of the edges 3 at the ends of the T-square to save edges 3 from injury in service and to close the ends of the opening in the hollow edges.

Although the invention has been described with reference to a formed hollow edge of folded sheet material the invention may well be carried out by providing an extruded solid edge of the same shape of edge 3 of either embodiment of the invention with a similar elimination of machining operations.

Edge 3 is assembled in groove 5 by pushing the edge into place by means of a straight edge block or the like in contact with the entire longitudinal extent of edge portion 6. Since edge 3 is of flexible material this manner of assembly keeps edge portion 6 straight during assembly so that it will not become distorted and provides the blade with a straight drawing edge. The block employed for pushing the edge into place may be a table top or other backing means against which the edge portion 6 is supported during entry of the tongue in the groove of the strip.

The invention provides a T-square in which machining operations at the working edge are eliminated together with machining operations at the joints between edge 3 and strip 1.

The shape of the edge improves transparency and prevents impairment of the transparency by scratching of the edge in service. Shaping the edge in the form of a triangle gives the edge rigidity and strength.

The loading of the tongue of the edge holds the edge in place in groove 5 and this manner of securement of the edge in the groove together with the flexibility of the edge insures that the working outer edge will be maintained vertical when the T-square is placed on a drawing surface.

The loading of the entire edge by initial contact thereof with the drawing board insures a tight contact with the drawing surface at all times.

Various embodiments of the invention may be employed within the scope of the accompanying claims.

I claim:

1. In a T-square or the like, a body strip having a narrow substantially horizontal deep groove in its edge face, a hollow transparent edge member having a thin inner edge portion entering said groove and secured therein to said strip, said edge member having a gradually increasing thickness from the mouth of said groove to its outer edge portion and the outer edge portion presenting a straight vertical wall providing a drafting edge and a support for triangles and the like, and a plug at the outer end of said hollow edge member to close the same against entry of dirt.

2. In a T-square or the like, a body strip member having a horizontal groove extending centrally of a substantial portion of the side edge thereof, and an edge member of tapered thickness formed from transparent sheet material having the edges of the sheet overlapping to provide the inner edge portion of the member with a thin tongue for disposing the same within the groove in said strip member, and the outer edge portion of the member having greater vertical thickness to provide a working portion with a straight unmachined face.

3. In a T-square or the like for use on drafting surfaces, a body strip having a horizontal longitudinally extending groove in its edge face, and an edge member secured in said groove and extending outwardly therefrom, said edge member being of gradually increasing thickness outwardly of the strip to provide the outer longitudinal portion with a generally thick, straight working face and the inner longitudinal portion with a generally thin tongue for insertion into said groove and to establish flexibility of the edge member at the mouth of the groove, and the said working face of the edge lying on a vertical plane substantially at right angles to the drafting surface when the T-square is placed thereon by the operator.

4. In a T-square or the like for use on drafting surfaces, a body strip having a horizontal longitudinally extending groove in its edge face, and a generally flexible edge member secured in said groove and extending outwardly therefrom, said edge member gradually tapering in thickness from a lesser cross-section at the inner longitudinal portion to a greater cross-section at the outer longitudinal portion for insertion of the inner portion in said groove and to provide flexibility of the edge at the mouth of said groove, the outer lower corner of said edge member extending lower than the bottom of the strip to effect initial contact of the edge with the drafting surface before the strip touches the same to load the edge and maintain tight contact with the drafting surface, and the tapered shape and flexibility of the edge at the mouth of said groove disposing the outer face of the edge on a vertical plane substantially at right angles to the drafting surface after the strip touches the same and the edge is loaded.

JAMES NASH.

REFERENCES CITED

The following references are of record in the file of this patent:

UNITED STATES PATENTS

| Number | Name | Date |
|---|---|---|
| 180,362 | Montgomery | July 25, 1876 |
| 285,404 | Gardam | Sept. 25, 1883 |
| 854,325 | Belcher | May 21, 1907 |
| 1,007,353 | Henschel | Oct. 31, 1911 |
| 1,082,626 | Foerst | Dec. 20, 1913 |
| 2,095,209 | Brownsdon | Oct. 5, 1937 |
| 2,130,932 | Sipe | Sept. 20, 1938 |
| 2,366,449 | Keuffel et al. | Jan. 2, 1945 |
| 2,411,529 | Dohrwardt et al. | Nov. 26, 1946 |